(No Model.)
J. W. LOVIBOND.
COLORIMETER.
No. 363,835. Patented May 31, 1887.
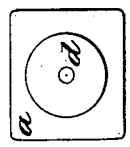
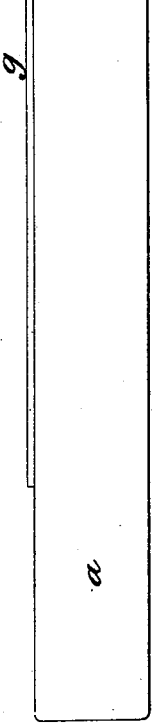
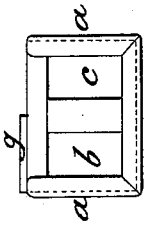
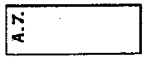
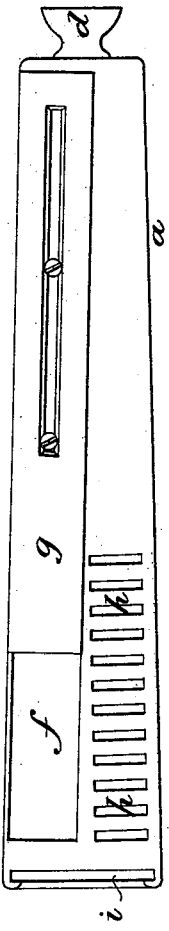
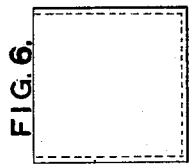
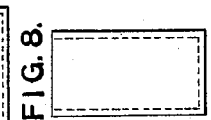
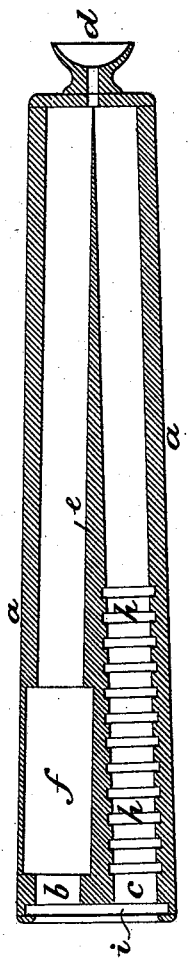
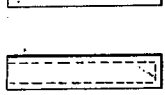

UNITED STATES PATENT OFFICE.

JOSEPH WILLIAMS LOVIBOND, OF SALISBURY, COUNTY OF WILTS, ENGLAND.

COLORIMETER.

SPECIFICATION forming part of Letters Patent No. 363,835, dated May 31, 1887.

Application filed November 23, 1886. Serial No. 219,603. (No model.)

*To all whom it may concern:*

Be it known that I, JOSEPH WILLIAMS LOVIBOND, a subject of the Queen of Great Britain, residing at St. Ann street, Salisbury, Wiltshire, England, brewer, maltster, and wine and spirit merchant, have invented certain new and useful Improvements in Apparatus for Standardizing and Measuring Intensity of Color, of which the following is a specification.

This invention has for its object improvements in apparatus for standardizing and measuring intensity of color. By "standardizing" is meant comparing with standard or testing as to standard.

I prepare a standard consisting of glass evenly tinted with the color to be standardized, so as to be just distinguishable on being looked through toward a white light. This I call a "single tint" or unit of color, and the place in the scale of any shade of the color is that represented by the number of units required to produce it. Single glasses to represent ten or any other number of units may be made. A separate set of glasses must be made and numbered for each color to be standardized.

The apparatus consists of a tube or case with two aperatures in one end, and at the other end a single aperture and eye-piece commanding a view of the two apertures at the other end. A partition in the tube is so placed that the beams of light entering the tube through the apertures cannot interfere with each other. The light entering by one aperture is caused to pass through the substance to be tested, and that entering by the other through the standardized glasses. All other rays of light are excluded. One of the apertures (which I call the "object-aperture") will therefore be seen colored by the liquid or solid to be tested and the other by the standard glasses.

When a liquid is to be tested, it is placed in a vessel of white glass with parallel ends at a definite distance from each other. This vessel is put into the tube so as to intersect the beam of light on one side of the partition, and standard glasses are then placed in the other portion of the tube until the colors in the two apertures are equal. The total of the numbers on the glasses used will represent the depth or units of color in the liquid tested.

In the case of a liquid of medium depth of color, a thickness of one inch is convenient for comparison with the standard-scale; but when the liquid to be tested is much lighter in tint this thickness must be doubled or increased in a definite ratio to the inch or other standard settled upon until it becomes readable. When the liquid is much darker than the medium, the thickness must be lessened until it becomes readable. This may be done by decreasing the size of the vessel, or by placing in the vessel blocks of white glass of the proper dimensions.

In order that my said invention may be fully understood and readily carried into effect, I will proceed to describe the drawings hereunto annexed.

In the drawings, Figure 1 is a side elevation of an apparatus for standardizing intensity of color in accordance with my invention. Figs. 2 and 3 are end elevations. Fig. 4 is a plan, and Fig. 5 is a horizontal section, of the same. Fig. 6 is a side elevation of a vessel of white glass for containing the liquid. Fig. 7 is an end elevation of the same. This vessel is double standard. Fig. 8 is a side elevation of another glass vessel, and this is the standard size and adapted to present in the beam of light a thickness of one inch of liquid. Fig. 9 is a side elevation of a half-standard vessel. Fig. 10 is a side elevation of a quarter-standard vessel. Fig. 11 is an edge view of a strip of white glass to be dropped into the quarter-standard vessel when it is desired to reduce it to an eighth-standard. Fig. 12 is a front view of one of the strips of tinted glass employed. Figs. 13 and 14 show a front and edge view of a piece of ground glass which is sometimes used.

$a\ a$ are the walls or sides of the tube or case. They are preferably of wood.

$b$ and $c$ are two object-apertures at one end of the tube. $d$ is a single eye-aperture at the other end.

$e$ is a partition separating the light which enters at $b$ from that which enters at $c$. The partition tapers to a knife-edge at the eye-piece end, and this edge bisects the aperture $d$.

$f$ is a cavity to receive the vessels shown by Figs. 6 to 10.

$g$ is a sliding cover to more or less close this aperture at the top to exclude extraneous light.

*h h* are grooves to receive the standard slips—such as represented by Fig. 12.

*i* is a recess to receive the ground glass shown by Figs. 13 and 14. This is not always used; but in some lights it will be found to assist.

The vessels six to ten may be made of flat pieces of glass put together with cement; or they may be made of pressed or cut glass.

The apparatus is used in the following manner: The liquid to be standardized, which should be quite clear and bright, if of medium shade, should be put into the vessel shown by Fig. 8, and this is then put into the cavity *f*. Then looking into the tube by the eye-piece at *d* and directing the instrument toward the light the aperture *b* is seen through a thickness of one inch of the colored liquor. Then test-strips, Fig. 12, are put into the grooves *h h*, and through these the aperture *c* will be simultaneously seen. Test-strips are inserted until the two apertures appear to be equally shaded, and then, if single-unit strips only be used, the number of strips will be the standard number of the shade or tint under examination. It is convenient, however, to employ some strips representing more than a single unit. Thus in Fig. 12 the letter A marked upon the strip denotes the quality of the color, while the numeral 7 denotes the intensity and shows that the value of this strip in the scale is seven units. In other words, this strip when used has the same effect as seven strips of unit intensity, which would each be marked A'.

It will be understood that if the vessel shown by Figs. 6 and 7 be used (as this gives a two-inch thickness of liquid) it becomes necessary to divide by two the number of units which the instrument shows, and similarly to multiply by two if the instrument shown by Fig. 9 be employed, and so on.

It is obvious that colored glasses and other translucent and colored solids can be similarly standardized, due regard being had to the thickness of the specimen submitted to examination.

The color of opaque solid bodies can be similarly standardized. The colored surface to be examined is placed in front of the aperture *b* and a white surface in front of the aperture *c*. Both should be well illuminated, and the examination is proceeded with as before.

What I claim is—

1. An apparatus for standardizing and measuring intensity of color, consisting of a tube or case with an eye-aperture at one end and object-apertures at the other end and standard strips inserted between the eye-apertures and one object-aperture, while the object to be examined is similarly inserted between the eye-aperture and the other standard-aperture, substantially as described.

2. An apparatus for standardizing and measuring intensity of color, consisting of a tube or case with an eye-aperture at one end and object-apertures at the other, and a partition between the object-apertures terminating in a knife-edge bisecting the eye-aperture, and provision for inserting standard-pieces on one side and the object to be examined on the other side, substantially as described.

JOSEPH WILLIAMS LOVIBOND.

Witnesses:
 JNO. H. WHITEHEAD,
  24 *Southampton Buildings, London, W. C.*,
 WALTER I. SKERTEN,
  17 *Gracechurch Street, London, E. C.*